US008761837B2

(12) United States Patent
Korach

(10) Patent No.: US 8,761,837 B2
(45) Date of Patent: Jun. 24, 2014

(54) COMMUNICATION DEVICE, COMMUNICATION HISTORY DISPLAY METHOD, AND COMPUTER-READABLE RECORDING MEDIUM RECORDED WITH COMMUNICATION HISTORY DISPLAY PROGRAM

(75) Inventor: Hiroko Korach, Lake Oswego, OR (US)

(73) Assignee: Kyocera Corporation, Kyoto (JP)

( * ) Notice: Subject to any disclaimer, the term of this patent is extended or adjusted under 35 U.S.C. 154(b) by 390 days.

(21) Appl. No.: 13/141,225

(22) PCT Filed: Dec. 21, 2009

(86) PCT No.: PCT/JP2009/007067
§ 371 (c)(1),
(2), (4) Date: Jun. 21, 2011

(87) PCT Pub. No.: WO2010/073587
PCT Pub. Date: Jul. 1, 2010

(65) Prior Publication Data
US 2011/0256908 A1 Oct. 20, 2011

(30) Foreign Application Priority Data

Dec. 22, 2008 (JP) ................................ 2008-326612

(51) Int. Cl.
*H04B 1/38* (2006.01)
(52) U.S. Cl.
USPC .......................... 455/566; 455/415; 455/550.1
(58) Field of Classification Search
USPC ................................................. 455/415, 566
See application file for complete search history.

(56) References Cited

U.S. PATENT DOCUMENTS

| 6,064,725 A | 5/2000 | Nakanishi |
| 8,175,259 B2 * | 5/2012 | Bocking et al. .......... 379/355.02 |
| 2005/0143135 A1 | 6/2005 | Brems et al. |

FOREIGN PATENT DOCUMENTS

| JP | A-10-126484 | 5/1998 |
| JP | A-11-196172 | 7/1999 |
| JP | A-2001-339535 | 12/2001 |

(Continued)

OTHER PUBLICATIONS

May 28, 2013 Notice of Allowance issued in Japanese Application No. 2008-326612 (w/ English Translation).

(Continued)

*Primary Examiner* — German J Viana di Prisco
(74) *Attorney, Agent, or Firm* — Oliff PLC

(57) ABSTRACT

In order to facilitate an operation of registering a telephone number from history information into a group, a mobile phone includes a flash memory for storing a phone book, a history storing portion which stores history information including telephone numbers of past communication partners, a history displaying portion which displays history information, a selecting portion which selects, as a process target, one of a plurality of pieces of the history information being displayed, and a display switching portion which, when the phone book includes a first telephone number and a second telephone number, switches a display to either the first telephone number or the second telephone number in response to an input of an operation of switching a display. When the process target is changed, the display switching portion displays one of the first communication identification information and the second communication identification information, included in the history information newly selected as the process target, that is the same as the one that had been displayed when the history information was previously selected as the process target.

11 Claims, 12 Drawing Sheets

(56) References Cited

FOREIGN PATENT DOCUMENTS

| JP | A-2003-169129 | 6/2003 |
| JP | A-2004-185434 | 7/2004 |
| JP | A-2007-513592 | 5/2007 |

OTHER PUBLICATIONS

FOMA N906iμ Instruction Manual, Jun. 2008, pp. 83-85, 2$^{nd}$ Edition, published by NTT DoCoMo Group (with translation).
International Search Report issued in International Application No. PCT/JP2009/007067 on Apr. 6, 2010 (with translation).

* cited by examiner

F I G. 1
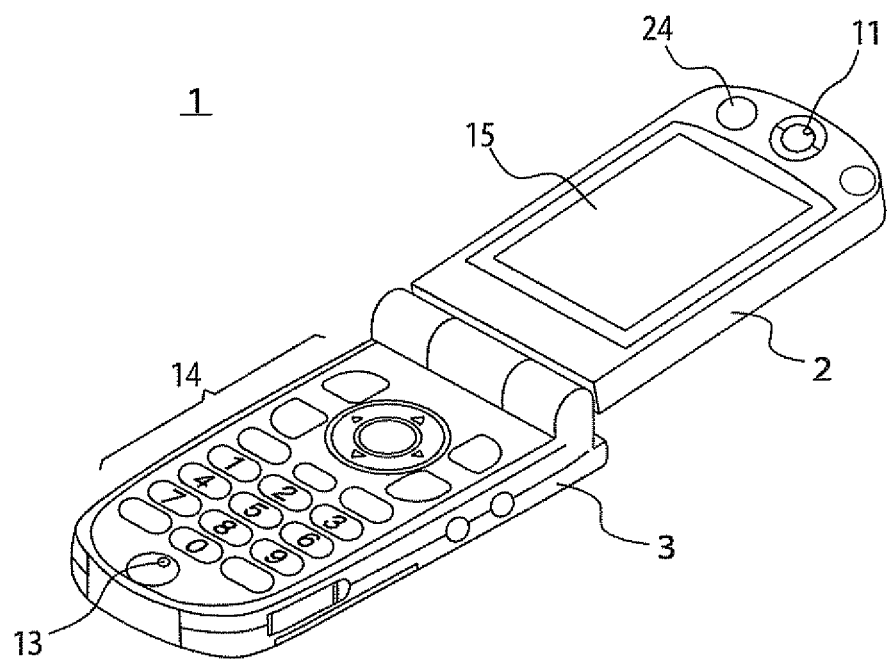

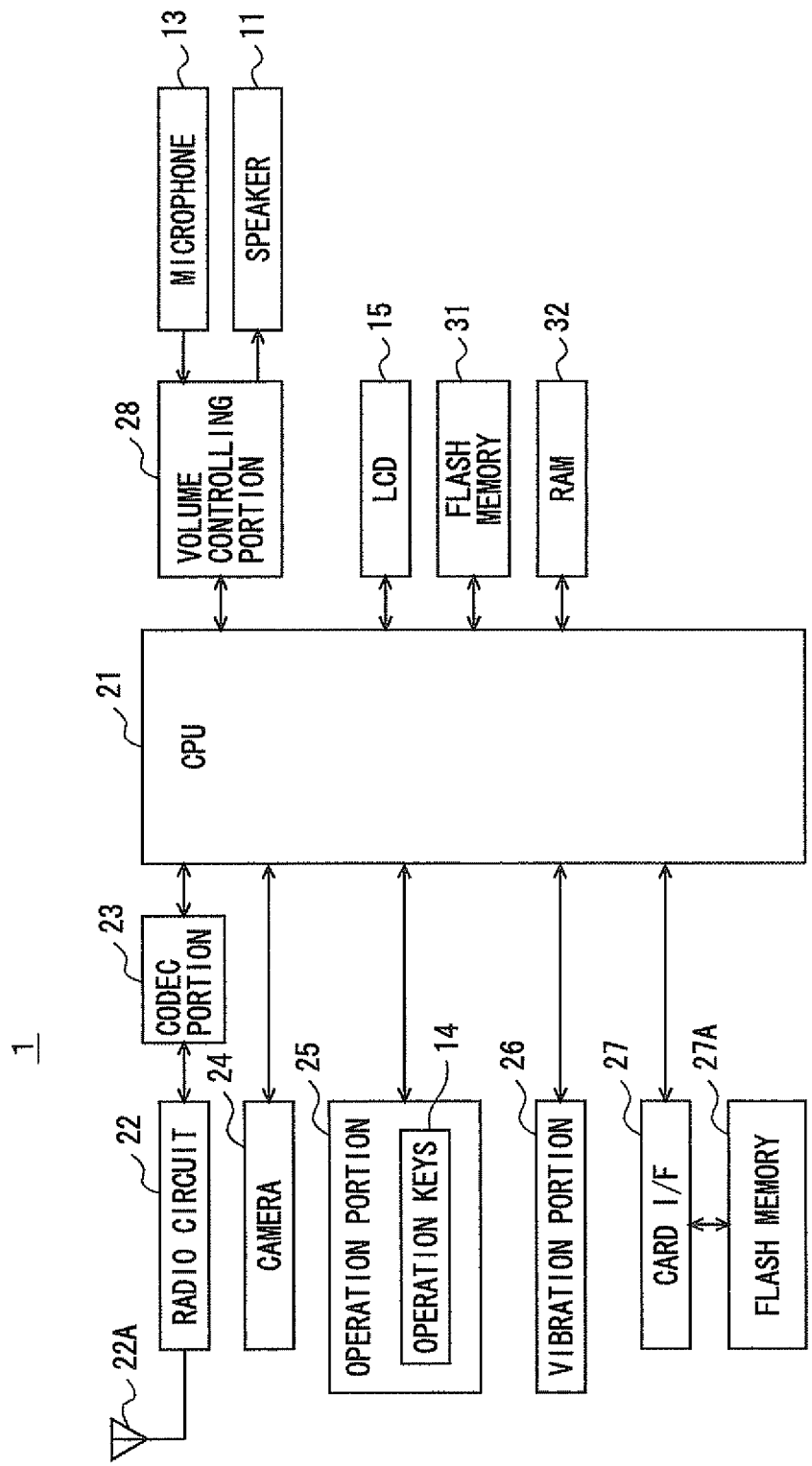
F I G. 2

F I G. 4

PHONE BOOK RECORD

| NAME | DESTINATION 1 | DESTINATION 2 | ... | DESTINATION N |
|---|---|---|---|---|
| USER IDENTIFICATION INFORMATION | DESTINATION IDENTIFICATION INFORMATION | DESTINATION IDENTIFICATION INFORMATION | ... | DESTINATION IDENTIFICATION INFORMATION |

F I G. 5

GROUP INFORMATION

| GROUP NUMBER | DESTINATION 1 | DESTINATION 2 | DESTINATION 3 | ... | DESTINATION M |
|---|---|---|---|---|---|
| GROUP IDENTIFICATION INFORMATION | DESTINATION IDENTIFICATION INFORMATION | DESTINATION IDENTIFICATION INFORMATION | DESTINATION IDENTIFICATION INFORMATION | ... | DESTINATION IDENTIFICATION INFORMATION |

COMMUNICATION DEVICE, COMMUNICATION HISTORY DISPLAY METHOD, AND COMPUTER-READABLE RECORDING MEDIUM RECORDED WITH COMMUNICATION HISTORY DISPLAY PROGRAM

TECHNICAL FIELD

The present invention relates to a communication device, a communication history display method, and a communication history display program. More particularly, the present invention relates to a communication device which stores a history of communication previously made with a communication partner, a communication history display method which is executed by the communication device, and a computer-readable recording medium recorded with a communication history display program which is executed by the communication device.

BACKGROUND ART

A recent mobile phone stores a phone book in which telephone numbers are associated with names. There is also provided a push-to-talk (PTT) service which allows a person to communicate with a plurality of communication partners at the same time. Japanese Patent National Publication No. 2007-513592 discloses a technique in which a plurality of telephone numbers registered in a phone book are grouped in advance, and when a group is selected, calls are originated to the telephone numbers registered in the group.

On the other hand, a mobile phone has the function of storing telephone numbers of past communication partners as a communication history. It will be convenient if a telephone number selected from among the telephone numbers stored as the communication history can be registered into a group in the same manner as in the case of registering a telephone number selected from among the telephone numbers stored in a phone book into a group. The history information, however, includes only the telephone number of the communication partner that was used for the previous communication. In the event that more than one telephone number is assigned by a phone book to the user who is assigned that telephone number, the telephone numbers other than that telephone number included in the history information will not be able to be registered into a group.

[Patent Document 1] Japanese Patent Laid-Open No. 2007-513592

DISCLOSURE OF THE INVENTION

Problems to be Solved by the Invention

The present invention has been accomplished to solve the above-described problems, and an object of the present invention is to provide a communication device which facilitates an operation of registering a telephone number from history information into a group.

Another object of the present invention is to provide a communication history display method which facilitates an operation of registering a telephone number from history information into a group.

A further object of the present invention is to provide a computer-readable recording medium recorded with a communication history display program which facilitates an operation of registering a telephone number from history information into a group.

Means for Solving the Problems

To achieve the above-described objects, according to an aspect of the present invention, there is provided a communication device which includes: a personal information storing portion to store personal information in which personal identification information for identifying a person is associated with at least one piece of communication identification information assigned to the person for use in communication; a communication history storing portion to store history information showing a history of communication, the history information including the communication identification information of a communication partner in the past; and a grouping portion to generate a group in which at least one piece of the communication identification information is collected together on the basis of the stored history information or the stored personal information, the grouping portion including a history displaying portion to display the stored history information, a selecting portion to select one piece of the displayed history information as a process target, and a display switching portion, in the case where the personal information includes first communication identification information included in the selected history information and second communication identification information different from the first communication identification information, to switch a display to the first communication identification information or the second communication identification information in response to an input of an operation for switching a display; wherein in the case where the process target is changed by the selecting portion, the display switching portion displays one of the first communication identification information and the second communication identification information, included in the history information newly selected as the process target, that is the same as the one that had been displayed when the history information was previously selected as the process target by the selecting portion.

According to another aspect of the present invention, there is provided a communication history display method which includes steps of: storing personal information in which personal identification information for identifying a person is associated with at least one piece of communication identification information assigned to the person for use in communication; storing history information showing a history of communication, the history information including the communication identification information of a communication partner in the past; and generating a group in which at least one piece of the communication identification information is collected together on the basis of the stored history information or the stored personal information, the step of generating a group including steps of displaying the stored history information, selecting one piece of the displayed history information as a process target, and in the case where the personal information includes first communication identification information included in the displayed history information and second communication identification information different from the first communication identification information, switching a display to the first communication identification information or the second communication identification information in response to an input of an operation for switching a display; wherein the step of switching a display includes a step of, in the case where the process target is changed in the selecting step, displaying one of the first communication identification information and the second communication identification information, included in the history information newly selected as the process target, that is the same as the one that had been displayed when the history information was previously selected as the process target in the selecting step.

According to a further aspect of the present invention, there is provided a computer-readable recording medium recorded with a communication history display program, the program causing a computer to execute steps of: storing personal information in which personal identification information for identifying a person is associated with at least one piece of communication identification information assigned to the person for use in communication; storing history information showing a history of communication, the history information including the communication identification information of a communication partner in the past; and generating a group in which at least one piece of the communication identification information is collected together on the basis of the stored history information or the stored personal information, the step of generating a group including steps of displaying the stored history information, selecting one piece of the displayed history information as a process target, and in the case where the personal information includes first communication identification information included in the displayed history information and second communication identification information different from the first communication identification information, switching a display to the first communication identification information or the second communication identification information in response to an input of an operation for switching a display; wherein the step of switching a display includes a step of, in the case where the process target is changed in the selecting step, displaying one of the first communication identification information and the second communication identification information, included in the history information newly selected as the process target, that is the same as the one that had been displayed when the history information was previously selected as the process target in the selecting step.

BRIEF DESCRIPTION OF THE DRAWINGS

FIG. 1 is a perspective view of a mobile phone according to an embodiment of the present invention;
FIG. 2 is a block diagram showing an example of the hardware configuration of the mobile phone according to the present embodiment;
FIG. 4 shows an example of a format of a phone book record;
FIG. 5 shows an example of a format of group information.

BEST MODES FOR CARRYING OUT THE INVENTION

Figure 3:
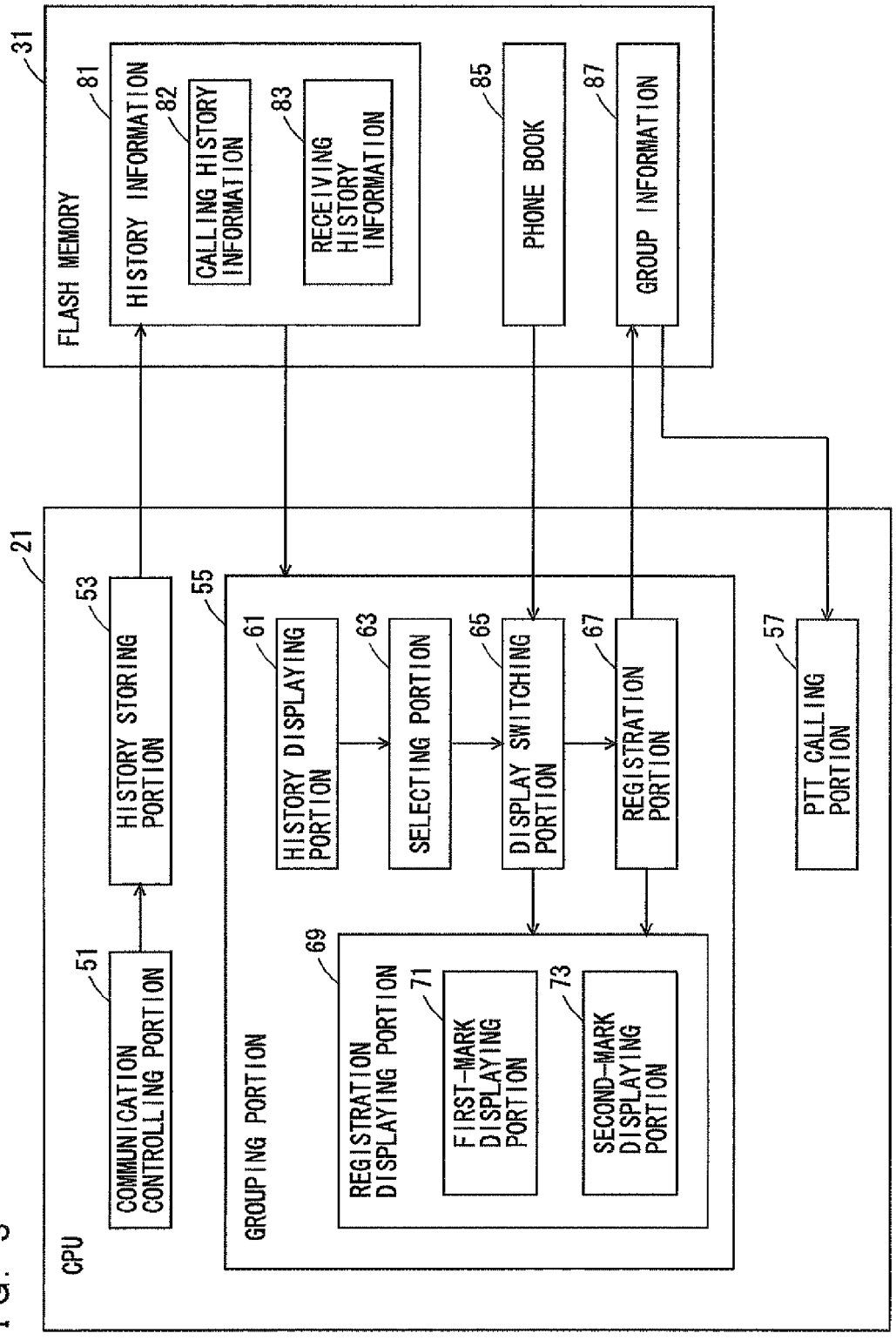
FIG. 3 is a functional block diagram schematically showing the functions of a CPU of a mobile phone according to an embodiment of the present invention, together with information stored in a flash memory.

Embodiments of the present invention will now be described with reference to the drawings. In the following description, like reference characters denote like parts, which have like names and functions, and therefore, detailed description thereof will not be repeated.

FIG. 1 is a perspective view of a mobile phone according to an embodiment of the present invention. FIG. 1 shows the mobile phone in an open style. Referring to FIG. 1, a mobile phone 1 as a communication device includes an operation side portion 3 and a display side portion 2. Operation side portion 3 has operation keys 14 including ten keys and a talk key, and a microphone 13 arranged on its inner surface. Display side portion 2 has a liquid crystal display (LCD) 15, a speaker 11 constituting a receiver, and a camera 24 arranged on its inner surface. Although mobile phone 1 has LCD 15 in this example, LCD 15 may be replaced with an organic electro-luminescence (EL) display. Operation side portion 3 and display side portion 2 are rotatably connected via a hinge mechanism to be freely opened and closed. The state where mobile phone 1 is folded and operation side portion 3 and display side portion 2 are in the closed position corresponds to the closed style of mobile phone 1, whereas the state where mobile phone 1 is open and operation side portion 3 and display side portion 2 are in the open position corresponds to the open style of mobile phone 1.

FIG. 2 is a block diagram showing an example of the hardware configuration of the mobile phone according to the present embodiment. Referring to FIG. 2, mobile phone 1 includes: a CPU 21 which is responsible for overall control of mobile phone 1; a radio circuit 22 connected to an antenna 22A; a codec portion 23 for encoding or decoding audio data; an audio controlling portion 28 for processing audio data; camera 24; an operation portion 25 for accepting an input of a user's operation; a vibration portion 26 for notifying of an incoming call or e-mail; a flash memory 31 for storing, among others, a program to be executed by CPU 21; a random access memory (RAM) 32 used as a work area for CPU 21; and a card interface (I/F) 27.

Radio circuit 22, which is controlled by CPU 21, communicates with a radio base station. Specifically, radio circuit 22 receives a radio signal received by antenna 22A, and outputs to codec portion 23 an audio signal obtained by demodulating the radio signal. Further, radio circuit 22 receives an audio signal from codec portion 23, and outputs to antenna 22A a radio signal obtained by modulating the audio signal. Codec portion 23 decodes an audio signal input from radio circuit 22, converts the decoded digital audio signal to an analog signal, and output it to audio controlling portion 28. Further, codec portion 23 receives an analog audio signal from audio controlling portion 28, converts the audio signal to a digital signal, encodes it, and outputs the encoded audio signal to radio circuit 22.

Furthermore, radio circuit 22 is able to perform data communication with a radio base station. More particularly, radio circuit 22 is able to communicate via the radio base station with an e-mail server connected threreto. Radio circuit 22 receives e-mail transmitted from an e-mail server, and outputs it to CPU 21. Radio circuit 22 transmits e-mail, received from CPU 21, to an e-mail server. CPU 21 stores the e-mail transmitted to or received from an e-mail server in flash memory 31.

Operation portion 25 includes operation keys 14 composed of a plurality of keys. Operation portion 25 accepts an input of a user's operation, and outputs the accepted operation to CPU 21.

Audio controlling portion 28, which is connected to microphone 13, receives an analog audio signal output from microphone 13 which collects sound. Audio controlling portion 28 outputs the audio signal received from microphone 13 to codec portion 23. Further, audio controlling portion 28 receives an audio signal from codec portion 23, and outputs the audio signal received from codec portion 23 to speaker 11.

Card I/F 27 is mounted with a removable memory card 27A. Memory card 27A, which has a nonvolatile memory such as a flash memory, is able to store a program. CPU 21 is capable of accessing memory card 27A via card I/F 27. While it is here assumed that the program to be executed by CPU 21 is stored in flash memory 31, the program may be stored in memory card 27A and read therefrom to be executed by CPU 21. The recording medium for storing the program is not restricted to memory card 27A. It may be a flexible disk, a cassette tape, an optical disk (compact disc-ROM (CD-ROM), magnetic optical disc (MO), mini disc (MD), digital versatile disc (DVD)), an optical card, or a semiconductor memory such as a mask ROM, an EPROM, an EEPROM, or the like. Still alternatively, the program may be downloaded from a computer connected to the Internet via radio circuit 22, to be executed by CPU 21. As used herein, the "program" includes not only the program directly executable by CPU 21, but also a source program, a compressed program, an encrypted program, and others.

Camera 24 is provided with a lens and a photoelectric conversion element such as a complementary metal oxide semiconductor (CMOS) sensor. The lens collects light and focuses it onto the CMOS sensor, which in turn performs photoelectric conversion of the received light to output image data to CPU 21. Camera 24 is controlled by CPU 21. Camera 24 starts picking up an image in accordance with an instruction from CPU 21, and outputs the obtained still image data or moving image data to CPU 21. CPU 21 displays on LCD 15 the still image data or the moving image data output from camera 24. Alternatively, CPU 21 encodes the still image data or the moving image data using a predetermined compression coding system, and stores the encoded data in flash memory 31, or memory card 27A mounted to card I/F 27.

FIG. 3 is a functional block diagram schematically showing the functions of a CPU of a mobile phone according to an embodiment of the present invention, together with information stored in a flash memory. Referring to FIG. 3, CPU 21 includes: a communication controlling portion 51 for controlling a call originating/receiving process; a history storing portion 53 for storing history information showing a history of an outgoing or incoming call previously originated or received, the history information including communication identification information of a communication partner of that call; a grouping portion 55 for grouping a plurality of telephone numbers together; and a PTT calling portion 57 for originating calls to a plurality of telephone numbers included in a group.

Communication controlling portion 51 controls a call originating/receiving process and an e-mail originating/receiving process. In the call originating/receiving process, the communication identification information of a communication partner is a telephone number assigned to a mobile phone of the communication partner. In the e-mail originating/receiving process, the communication identification information of a communication partner is an e-mail address assigned to a telephone of the communication partner or to that communication partner. It is noted that the telephone includes a land-line phone connected to the public switched telephone networks (PSTN) and a mobile phone connected to a wireless network.

When radio circuit 22 receives an incoming-call signal from a base station, communication controlling portion 51 outputs a telephone number included in the incoming-call signal, as the telephone number of the source of the incoming call, to history storing portion 53. Following the reception of the incoming-call signal, when detecting that a user has depressed an off-hook key in operation keys 14, communication controlling portion 51 connects a line via the base station to the telephone of the source of the incoming call, to enable a telephone conversation.

When radio circuit 22 receives an e-mail from a base station, communication controlling portion 51 stores the e-mail in flash memory 31, and outputs an e-mail address of a source of the e-mail included in the e-mail, as the e-mail address of the source of the received e-mail, to history storing portion 53. Following the reception of the e-mail, when detecting that a user has depressed one of operation keys 14 to which an operation of reading e-mail is assigned, communication controlling portion 51 displays on LCD 15 the e-mail stored in flash memory 31.

When a user of mobile phone 1 directly inputs a telephone number using operation keys 14, communication controlling portion 51 outputs the input telephone number, as the telephone number of the destination of the outgoing call, to history storing portion 53. Further, when a telephone number is input from a history displaying portion 63, which will be described later, communication controlling portion 51 outputs the input telephone number, as the telephone number of the destination of the outgoing call, to history storing portion 53. Following the input of the telephone number of the destination of the outgoing call, when detecting that a user has depressed an off-hook key in operation keys 14, communication controlling portion 51 makes a call to the telephone of the destination of the outgoing call via the base station. When the telephone of the destination of the outgoing call answers, communication controlling portion 51 connects a line to the telephone of the destination of the outgoing call, to enable a telephone conversation.

When a user of mobile phone 1 directly inputs an e-mail address using operation keys 14, communication controlling portion 51 outputs the input e-mail address, as the e-mail address of the destination of the e-mail, to history storing portion 53. Further, when an e-mail address is input from history displaying portion 63, which will be described later, communication controlling portion 51 outputs the input e-mail address, as the e-mail address of the destination of the e-mail, to history storing portion 53. Following the input of the e-mail address of the destination of the e-mail, when detecting that a user has depressed one of operation keys 14 to which an operation of transmitting e-mail is assigned, communication controlling portion 51 transmits the e-mail to an e-mail server via a base station.

For management of a communication history, whether to use a telephone number or an e-mail address as the communication identification information assigned to a communication partner depends only on a communication system. Therefore, in the following description, it is assumed that a telephone number is used as the communication identification information of a communication partner, unless otherwise specified.

Flash memory 31 stores history information 81, a phone book 85, and group information 87. History information 81 includes: calling history information 82 which shows a history of an outgoing call and includes a telephone number as the communication identification information of a destination of the outgoing call; and receiving history information 83 which shows a history of an incoming call and includes a telephone number of a source of the incoming call. Specifically, calling history information 82 includes a telephone number of a destination of an outgoing call, time of call-out, and the number of originated calls. The time when a call was originated most recently is set as the time of call-out, and the number of times a call was originated by that time is set as the number of originated calls. Receiving history information 83 includes a telephone number as the communication identification information of a source of an incoming call, time of call-in, and the number of received calls. The time when a call was received most recently is set as the time of call-in, and the number of times a call was received by that time is set as the number of received calls. Thus, calling history information 82 and receiving history information 83 are each stored one piece for one telephone number. While it is here assumed that calling history information 82 includes the number of originated calls and receiving history information 83 includes the number of received calls, calling history information 82 including a telephone number and the time of call-out may be stored every time a call is originated, and receiving history information 83 including a telephone number and the time of call-in may be stored every time a call is received. In this case, the number of originated calls can be calculated by the number of pieces of the calling history information including the same telephone number, and the number of received calls can be calculated by the number of pieces of the receiving history information including the same telephone number.

Herein, the telephone number of a communication partner included in calling history information 82 or receiving history information 83 is called a first telephone number.

Phone book 85 includes a phone book record for each person. FIG. 4 shows an example of a format of the phone book record. Referring to FIG. 4, the phone book record includes the fields of name, destination 1, destination 2, ..., and destination N, where N is a positive integer. In the name field, user identification information for identifying a person as a communication partner is set. In each of the destination 1 to destination N fields, communication identification information assigned to a person who is specified by the user identification information set in the name field is set. The communication identification information includes, for example, a telephone number assigned to a mobile phone, a telephone number assigned to a land-line phone, a telephone number assigned to a facsimile machine, an e-mail address assigned to the person, and the like. That is, the phone book record associates one or more pieces of communication identification information with a person.

Returning to FIG. 3, history storing portion 53, on receipt of a telephone number of a source of an incoming call from communication controlling portion 51, generates receiving history information including the input telephone number, and stores it in flash memory 31, whereby receiving history information 83 is stored in flash memory 31. When receiving a telephone number of a destination of an outgoing call from communication controlling portion 51, history storing portion 73 generates calling history information including the input telephone number, and stores it in flash memory 31, whereby calling history information 82 is stored in flash memory 31.

When history storing portion 53 is about to store the generated receiving history information in flash memory 31, in the case where receiving history information 83 including the same telephone number as that included in the generated receiving history information has already been stored in flash memory 31, history storing portion 53 refrains from storing the generated receiving history information in flash memory 31. Rather, history storing portion 53 modifies that receiving history information 83 which includes the same telephone number as that included in the generated receiving history information and is stored in flash memory 31, by incrementing the number of received calls stored therein by one, and by replacing the time of call-in stored therein with the time when the relevant call was received. Similarly, when history storing portion 53 is about to store the generated calling history information in flash memory 31, in the case where calling history information 82 including the same telephone number as that included in the generated calling history information has already been stored in flash memory 31, history storing portion 53 refrains from storing the generated calling history information in flash memory 31, but rather, it modifies that calling history information 82 which includes the same telephone number as that included in the generated calling history information and is stored in flash memory 31, by incrementing the number of originated calls stored therein by one, and by replacing the time of call-out stored therein with the time when the relevant call was originated.

Grouping portion 55 includes: a history displaying portion 61 for displaying history information; a selecting portion 63 for selecting one of a plurality of pieces of history information; a display switching portion 65; a registration portion 67 for registering a telephone number into a group; and a registration displaying portion 69 for displaying a mark indicating that a telephone number is registered in a group.

When a user inputs a history display instruction using operation keys 14, history displaying portion 63 reads history information 81 to list the read history information 81 on LCD 15. Specifically, when a user inputs an instruction to display a calling history using operation keys 14, the history displaying portion reads a plurality of pieces of calling history information 82 and sorts them in order of the time of call-out, to thereby display the list thereof. Further, when a user inputs an instruction to display a receiving history using operation keys 14, history displaying portion 63 reads a plurality of pieces of receiving history information 83 and sorts them in order of the time of call-in, to thereby display the list thereof.

When receiving history information 83 is read from flash memory 31, history displaying portion 63 refers to phone book 85 stored in flash memory 31. At this time, in the case where a phone book record including the first telephone number included in receiving history information 83 read from flash memory 31 is included in phone book 85, the history displaying portion obtains user identification information which is set in the name field of the phone book record, and displays on LCD 15 the user identification information obtained from phone book 85 and the first telephone number included in receiving history information 83. Similarly, when calling history information 82 is read from flash memory 31, history displaying portion 63 refers to phone book 85 stored in flash memory 31. At this time, in the case where a phone book record including the first telephone number included in calling history information 82 read from flash memory 31 is included in phone book 85, the history displaying portion obtains user identification information which is set in the name field of the phone book record, and displays on LCD 15 the user identification information obtained from phone book 85 and the first telephone number included in calling history information 82. History displaying portion 63 then outputs history identification information for identifying the receiving history information 83 or calling history information 82 being displayed on LCD 15, to selecting portion 63.

Selecting portion 63 accepts a selection of calling history information 82 or receiving history information 83 which is listed on LCD 15 by history displaying portion 61. Specifically, when a user operates a selection key included in operation keys 14 to move a cursor on the list of calling history information 82 or receiving history information 83 displayed on LCD 15, the one of the pieces of the calling history information or the receiving history information that is under the cursor is selected. Selecting portion 63 outputs the history identification information for identifying the selected piece of calling history information 82 or receiving history information 83, to display switching portion 65.

Display switching portion 65, when receiving the history identification information from selecting portion 63, sets the calling history information or the receiving history information specified by the input history identification information, to a process target. Then, when receiving a switching instruction, display switching portion 65 searches phone book 85, using as a key the first telephone number included in the calling history information or the receiving history information set as the process target, to extract a phone book record including that first telephone number. When a user operates a switching key included in operation keys 14, display switching portion 65 accepts a switching instruction. When the phone book record including the first telephone number is extracted from selecting portion 63, display switching portion 65 determines whether the extracted phone book record includes a second telephone number which is different from the first telephone number. A phone book record can associate one or more telephone numbers with a person, as described above, so that the phone book record may include a plurality of telephone numbers. In the case where the extracted phone book record includes more than one telephone number, display switching portion 65 displays the second telephone number included in the extracted phone book record, in place of the first telephone number that is being displayed as calling history information 82 or receiving history information 83 which was selected by selecting portion 63 from among calling history information 82 or receiving history information 83 listed on LCD 15. In the case where the phone book record includes three or more telephone numbers, there is more than one second telephone number. In this case, the plurality of second telephone numbers are displayed one by one whenever the switching key in operation keys 14 is depressed.

After the second telephone number is displayed in place of the first telephone number, when the switching key in operation keys 14 is depressed, display switching portion 65 displays the first telephone number included in the selected calling history information 82 or receiving history information 83, in place of the second telephone number that is being displayed in place of the first telephone number.

Whenever the display is switched, display switching portion 65 temporarily stores a combination of the history identification information and the one of the first telephone number and the second telephone number that is being displayed on LCD 15, and also outputs the combination to registration portion 67 and registration displaying portion 69.

History displaying portion 61 displays a list of calling history information 82 or receiving history information 83 on LCD 15. There is a limit to the number of pieces of calling history information 82 or receiving history information 83 that can be displayed on LCD 15 at a time. It is here assumed that the number of pieces of calling history information 82 or receiving history information 83 that can be displayed on LCD 15 at a time is limited to two. Therefore, in the case where there are three or more pieces of calling history information 82 or receiving history information 83, a user has to switch a screen for displaying the one that is not being displayed. After a piece of calling history information 82 or receiving history information 83 ceases to be displayed, when an instruction to display that piece again is accepted, history displaying portion 61 displays it. As for a piece of calling history information 82 or receiving history information 83 that once was displayed on LCD 15 and ceased to be displayed thereon, display switching portion 65 may have switched its display to the second telephone number while the same was being displayed. In such a case, if the piece of calling history information 82 or receiving history information 83 including the first telephone number, the display of which was switched to the second telephone number by display switching portion 65, is displayed again as it is, the first telephone number that had been displayed before switching of the display by display switching portion 65 would be displayed.

Thus, when receiving the history identification information of calling history information 82 or receiving history information 83 that is to be displayed again by history displaying portion 61, display switching portion 65 displays the one of the first telephone number and the second telephone number that is paired with the history identification information temporarily stored.

Then, registration portion 67, in responsive to depression of a key in operation keys 14 to which an operation of instructing group registration is assigned, registers the first or second telephone number input from display switching portion 65, into a group. For the registration into the group, group information is generated and stored in flash memory 31. Registration portion 67 outputs the one of the first telephone number and the second telephone number that has been registered into a group, to registration displaying portion 69.

FIG. 5 shows an example of a format of the group information. Referring to FIG. 5, the group information includes the fields of group number, destination 1, destination 2, . . . , and destination M, where M is a positive integer. In the group number field, group identification information for identifying a group is set. In each of the destination 1 to M fields, communication identification information included in the group that is specified by the group identification information set in the group number field is set. The communication identification information includes, for example, a telephone number assigned to a mobile phone, a telephone number assigned to a land-line phone, a telephone number assigned to a facsimile machine, an e-mail address assigned to a user, and the like. That is, the group information associates one or more pieces of communication identification information with a group.

Returning to FIG. 3, when no group information has been generated, registration portion 67 generates new group information in which new group identification information is set in the group number field, and sets the selected first or second telephone number in the destination 1 field. Registration portion 67 then stores the generated group information in flash memory 31, whereby group information 87 is stored in flash memory 31. In the case where group information 87 has already been generated and stored in flash memory 31, registration portion 67 sets the selected first or second telephone number in one of the destination 2 to M fields in the stored group information 87 in which nothing has been set yet, and stores the resultant group information in flash memory 31.

After the first or second telephone number has been registered into a group by registration portion 67, display switching portion 65 may switch a display. For example, after the first telephone number is registered, display switching portion 65 may switch a display to the second telephone number. Conversely, after the second telephone number is registered, display switching portion 65 may switch a display to the first telephone number.

Registration displaying portion 69 receives from display switching portion 65 one of the first telephone number and the second telephone number that is being displayed on LCD 15, and receives from registration portion 67 one of the first telephone number and the second telephone number that has been registered in a group. Registration displaying portion 69 includes a first-mark displaying portion 71 and a second-mark displaying portion 73.

In the case where the one of the first telephone number and the second telephone number that is being displayed on LCD 15 has been registered in a group, first-mark displaying portion 71 displays a first mark near the one of the first telephone number and the second telephone number that is being displayed on LCD 15. It is here assumed that the first mark is a check mark.

In the case where the one of the first telephone number and the second telephone number that is being displayed on LCD 15 has not been registered in a group, and the one of the first telephone number and the second telephone number that is not being displayed on LCD 15 has been registered in a group, second-mark displaying portion 73 displays a second mark near the one of the first telephone number and the second telephone number that is being displayed on LCD 15. It is here assumed that the second mark is a hatch pattern.

In the case where neither the first telephone number nor the second telephone number has been registered in a group, first-mark displaying portion 71 and second-mark displaying portion 73 displays nothing near the one of the first telephone number and the second telephone number that is being displayed on LCD 15.

PTT calling portion 57, when accepting an operation of designating one piece of the group information generated by grouping portion 61, reads the designated grouping information and originates calls to all the telephone numbers included in the group information, allowing a PTT service to be used. It is noted that, when the communication identification information is an e-mail address, PTT calling portion 57 transmits e-mails with the same content to all the e-mail addresses included in the group information.

Figure 6:
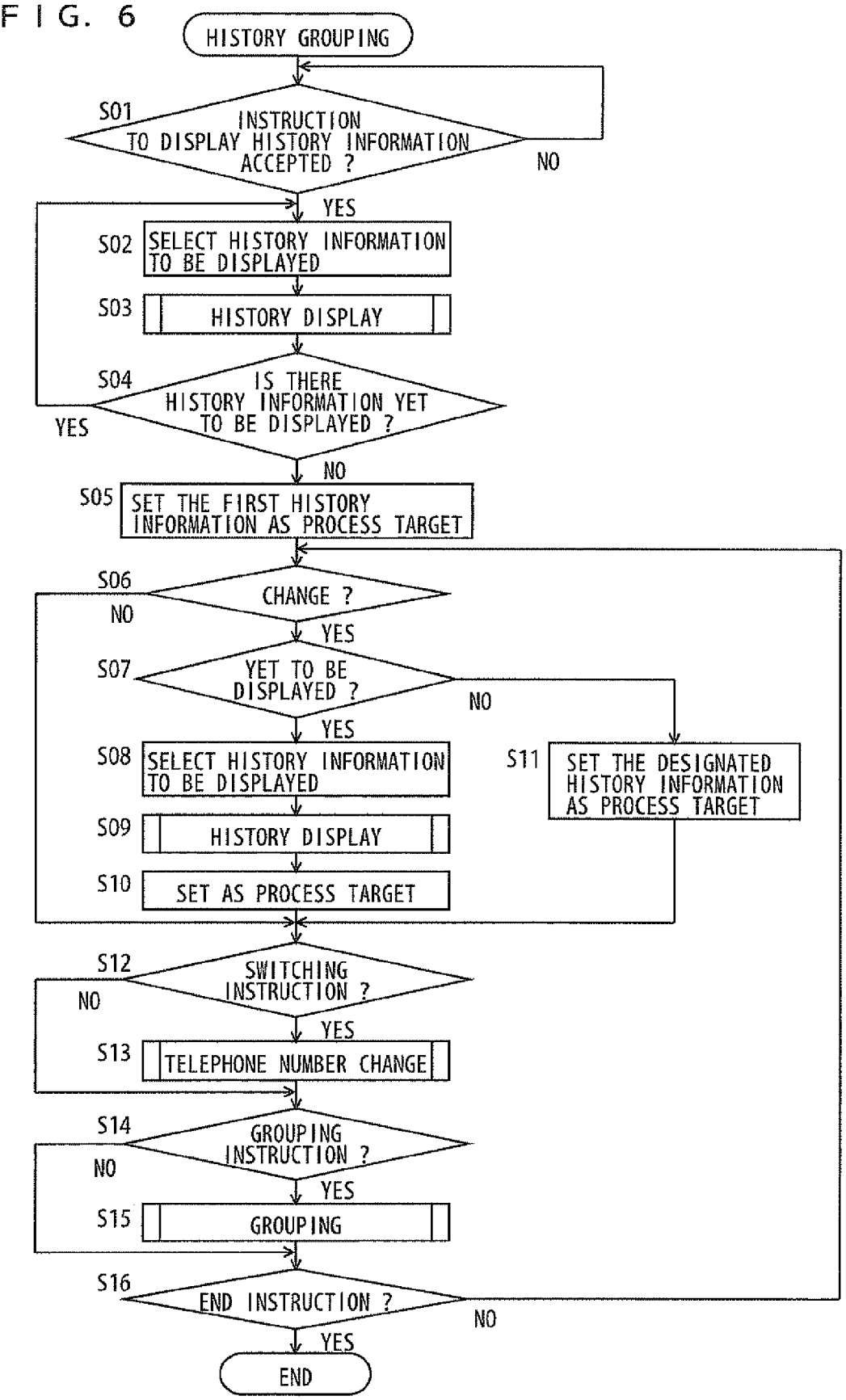
FIG. 6 is a flowchart illustrating an example of the flow of a history grouping process.

FIG. 6 is a flowchart illustrating an example of the flow of a history grouping process. The history grouping process is carried out by CPU 21 as CPU 21 executes a communication history display program. The history grouping process is a process of displaying receiving history information 83 or calling history information 82 to register it into a group. The only difference between the two types of processes is which one of receiving history information 83 and calling history information 82 is displayed. Thus, herein, calling history information 82 and receiving history information 83 are collectively referred to as history information, and description will be made about the case of displaying the history information.

Referring to FIG. 6, CPU 21 determines whether an instruction to display history information has been accepted (step S01). When detecting that one of operation keys 14 to which an operation of displaying the history information is assigned has been depressed, CPU 21 accepts an instruction to display the history information. CPU 21 is in a standby mode until an instruction to display the history information is accepted (NO in step S01), and once the instruction to display the history information is accepted (YES in step S01), the process proceeds to step S02. The instruction to display the history information includes an instruction to display receiving history information 83 and an instruction to display calling history information 82.

In step S02, CPU 21 selects a piece of history information to be displayed, from calling history information 82 or receiving history information 83 stored in flash memory 31. Then, CPU 21 performs a history displaying process on the selected history information (step S03). The history displaying process will be described later in detail. Upon completion of the history displaying process, CPU 21 determines whether there is another piece of history information to be displayed (step S04). If there is a piece of history information yet to be displayed, the process returns to step S02; otherwise, the process proceeds to step S05. It is here assumed that two pieces of history information can be displayed on LCD 15. Thus, if the history displaying process has been performed on two pieces of history information in step S03, CPU 21 determines that there is no more piece of history information to be displayed. That is, the process proceeds to step S05 when two pieces of history information are displayed on LCD 15.

In step S05, the history information that has been displayed first is set as a process target. The one of the two pieces of history information displayed on LCD 15 that has been set as the process target can be displayed in a form different from that of the other piece of the history information, to inform a user of the piece of the history information that is set as the process target.

In step S06, it is determined whether an instruction to change the history information set as the process target has been accepted. When a user operates a selection key included in operation keys 14 to move a cursor on the list of calling history information 82 or receiving history information 83 displayed on LCD 15, the history information that is under the cursor is selected. It is here assumed that the selection key is up and down arrow keys included in operation keys 14 of mobile phone 1. If an instruction to change the history information has been accepted, the process proceeds to step S07; otherwise, the process proceeds to step S12.

In step S07, it is determined whether the history information about to be set as a process target is currently displayed on LCD 15. If the history information is not displayed on the LCD, the process proceeds to step S08; otherwise, the process proceeds to step S11. For example, when the up arrow key is depressed in the state where the upper one of the two pieces of history information displayed is set as a process target, or when the down arrow key is depressed in the state where the lower one of the two pieces of history information displayed is set as a process target, it is determined that the history information about to be set as a process target is not displayed.

In step S08, the history information about to be set as a process target is selected. Specifically, when the up arrow key is depressed in the state where the upper one of the two pieces of history information displayed is set as a process target, the preceding or previous history information is selected. When the down arrow key is depressed in the state where the lower one of the two pieces of history information displayed is set as a process target, the succeeding or next history information is selected. In step S09, the history displaying process is performed, and the process proceeds to step S12. In step S10, the history information selected in step S08 is set as a process target, and the process proceeds to step S12.

On the other hand, in step S11, the designated one of the plurality of pieces of history information that is already displayed on LCD 15 is set as a process target, and the process proceeds to step S12. When the down arrow key is depressed in the state where the upper one of the two pieces of history information displayed is set as a process target, the lower history information being displayed is set as a process target. When the up arrow key is depressed in the state where the lower one of the two pieces of history information displayed is set as a process target, the upper history information being displayed is set as a process target.

In step S12, it is determined whether a switching instruction has been accepted. When a user operates a switching key included in operation keys 14, a switching instruction is accepted. If the switching instruction has been accepted, the process proceeds to step S13; otherwise, the process proceeds to step S14, with step S13 being skipped. In step S13, a telephone number changing process is performed, and the process proceeds to step S14. The telephone number changing process will be described later.

In step S14, it is determined whether a grouping instruction has been accepted. When one of operation keys 14 to which an operation of instructing group registration is assigned is depressed, a grouping instruction is accepted. If the grouping instruction has been accepted, the process proceeds to step S15; otherwise, the process proceeds to step S16, with step S15 being skipped. In step S15, a grouping process is performed, and the process proceeds to step S16. The grouping process will be described later in detail.

In step S16, it is determined whether an end instruction has been accepted. When one of operation keys 14 to which an operation of terminating display of the history information is assigned is depressed, an end instruction is accepted. If the end instruction has been accepted, the process is terminated; otherwise, the process returns to step S06.

Figure 7:
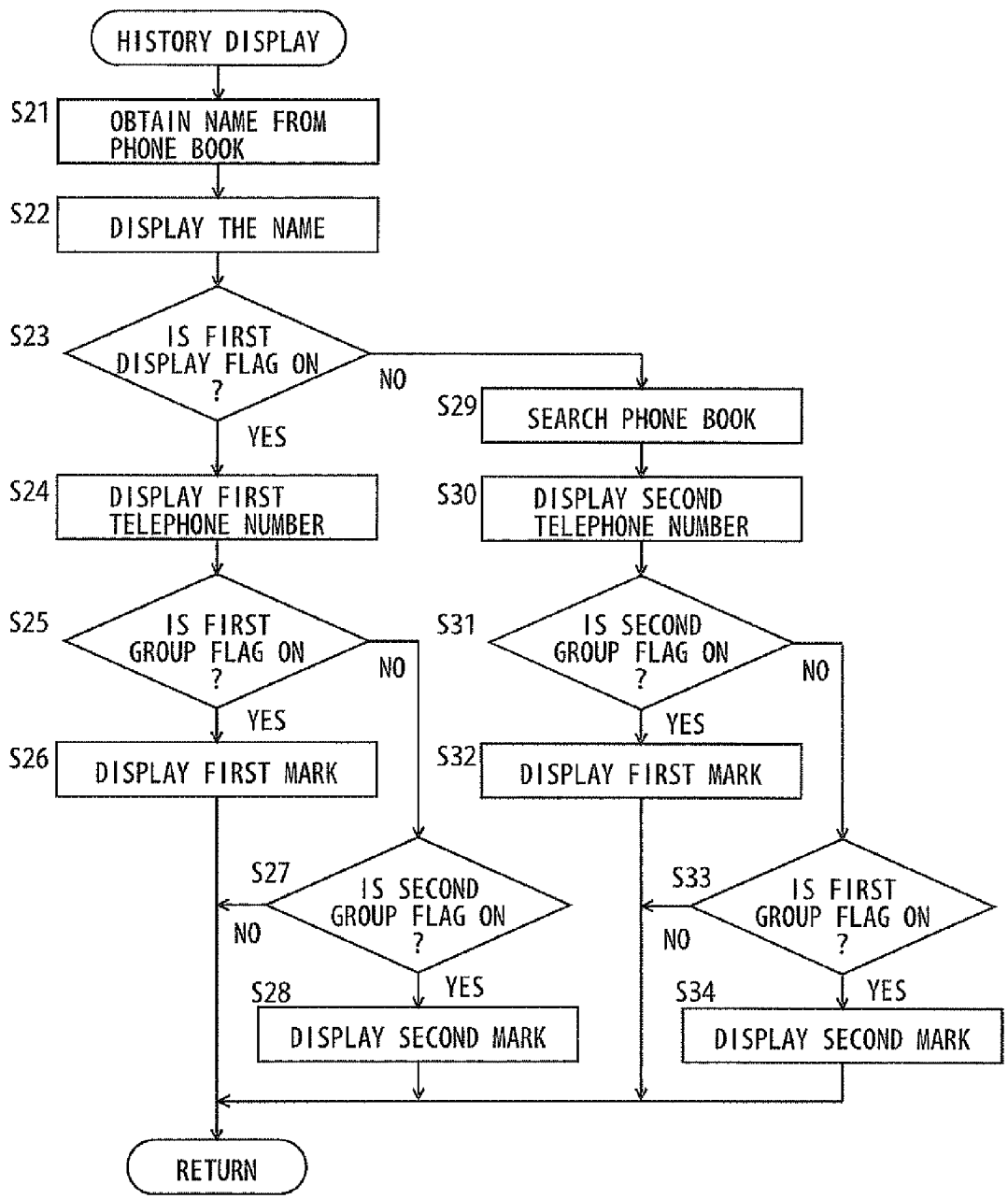
FIG. 7 is a flowchart illustrating an example of the flow of a history displaying process.

FIG. 7 is a flowchart illustrating an example of the flow of the history displaying process. The history displaying process is a process performed in step S03 or step S09 in FIG. 6. In the case where the history displaying process is performed, a piece of history information has been set as a process target. The history displaying process is a process of displaying the history information set as a process target on LCD 15.

In the history displaying process, four flags of a first display flag, a second display flag, a first group flag, and a second group flag are used. The first display flag is a flag showing, for each piece of history information, whether the first telephone number is set as a display target. In the case where the first telephone number is set as a display target, the flag is ON; otherwise, the flag is OFF. The first display flag is set to ON in the initial state, and is set to OFF in the telephone number changing process, which will be described later. The second display flag is a flag showing, for each piece of history information, whether the second telephone number is set as a display target. In the case where the second telephone number is set as a display target, the flag is ON; otherwise, the flag is OFF. The second display flag is set to OFF in the initial state, and is set to ON in the telephone number changing process, which will be described later. The first display flag and the second display flag are exclusively set to ON. That is, when the first display flag is ON, the second display flag is OFF, whereas when the second display flag is ON, the first display flag is OFF.

The first group flag is a flag showing, for each piece of history information, whether the first telephone number is registered in a group. In the case where the first telephone number is registered in a group, the flag is ON; otherwise, the flag is OFF. The first group flag is set to OFF in the initial state, and is set to ON in the grouping process, which will be described later. The second group flag is a flag showing, for each piece of history information, whether the second telephone number is registered in a group. In the case where the second telephone number is registered in a group, the flag is ON; otherwise, the flag is OFF. The second group flag is set to OFF in the initial state, and is set to ON in the grouping process, which will be described later.

Referring to FIG. 7, in step S21, CPU 21 obtains the name of a communication partner who has been assigned the first telephone number that is included in the history information set as a process target. Specifically, CPU 21 searches phone book 85 stored in flash memory 31 to extract a phone book record that includes the first telephone number included in the history information set as a process target. Then, CPU 21 obtains the user identification information which is set in the name field in the extracted phone book record, i.e. a name in this example. The name obtained is displayed on LCD 15, and the process proceeds to step S23.

In step S23, it is determined whether the first display flag for the history information set as a process target is set to ON. If the first display flag has been set to ON, the process proceeds to step S24; otherwise, the process proceeds to step S29. In the case where the process proceeds to step S24, the first telephone number included in the history information set as a process target is displayed on LCD 15, and the process proceeds to step S25.

In step S25, it is determined whether the first group flag for the history information set as a process target is set to ON. If the first group flag has been set to ON, the process proceeds to step S26; otherwise, the process proceeds to step S27. In step S26, a first mark is displayed near the first telephone number that is displayed on LCD 15, and the process returns to the history grouping process. The first mark is a mark indicating that the telephone number being displayed on LCD 15, i.e. the first telephone number included in the history information set as a process target in this example, is registered in a group. Herein, the first mark is a check mark. The first mark displayed near the first telephone number can inform a user that the first telephone number displayed on LCD 15 is registered in a group.

In step S27, it is determined whether the second group flag for the history information set as a process target is set to ON. If the second group flag has been set to ON, the process proceeds to step S28; otherwise, the process returns to the history grouping process. In step S28, a second mark is displayed near the first telephone number that is displayed on LCD 15, and the process returns to the history grouping process. The second mark is a mark indicating that a second telephone number that is different from the first telephone number, which is being displayed on LCD 15, included in the history information set as a process target in this example, is registered in a group. Herein, the second mark is a mark including a hatch pattern. The second mark displayed near the first telephone number can inform a user that the first telephone number displayed on LCD 15 is not registered in a group and that the second telephone number is registered in a group.

The case where it is determined in step S27 that the second group flag for the history information set as a process target is not set to ON corresponds to the case where the first group flag and the second group flag are both set to OFF. In this case, nothing is displayed near the first telephone number, which can inform a user that neither the first telephone number nor the second telephone number is registered in a group.

On the other hand, the process proceeds to step S29 in the case where the second display flag has been set to ON. In this case, CPU 21 searches phone book 85 stored in flash memory 31 (step S29), to obtain the second telephone number. Specifically, as in step S21, CPU 21 extracts a phone book record including the first telephone number included in the history information set as a process target, and obtains the second telephone number that is included in the extracted phone book record. Then, the obtained second telephone number is displayed on LCD 15 (step S30), and the process proceeds to step S31.

In step S31, it is determined whether the second group flag for the history information set as a process target is set to ON. If the second group flag has been set to ON, the process proceeds to step S32; otherwise, the process proceeds to step S33. In step S32, a first mark is displayed near the second telephone number that is displayed on LCD 15, and the process returns to the history grouping process. The first mark is a mark indicating that the telephone number being displayed on LCD 15, i.e. the second telephone number here, is registered in a group. Herein, the first mark is a check mark. The first mark displayed near the second telephone number can inform a user that the second telephone number displayed on LCD 15 is registered in a group.

In step S33, it is determined whether the first group flag for the history information set as a process target is set to ON. If the first group flag has been set to ON, the process proceeds to step S34; otherwise, the process returns to the history grouping process. In step S34, a second mark is displayed near the second telephone number that is displayed on LCD 15, and the process returns to the history grouping process. The second mark is a mark indicating that a first telephone number that is different from the second telephone number which is being displayed on LCD 15 here, is registered in a group. Herein, the second mark is a mark including a hatch pattern. The second mark displayed near the second telephone number can inform a user that the second telephone number displayed on LCD 15 is not registered in a group and that the first telephone number is registered in a group.

The case where it is determined in step S33 that the first group flag for the history information set as a process target is not set to ON corresponds to the case where the first group flag and the second group flag are both set to OFF. In this case, nothing is displayed near the second telephone number, which can inform a user that neither the first telephone number nor the second telephone number is registered in a group.

Figure 8:
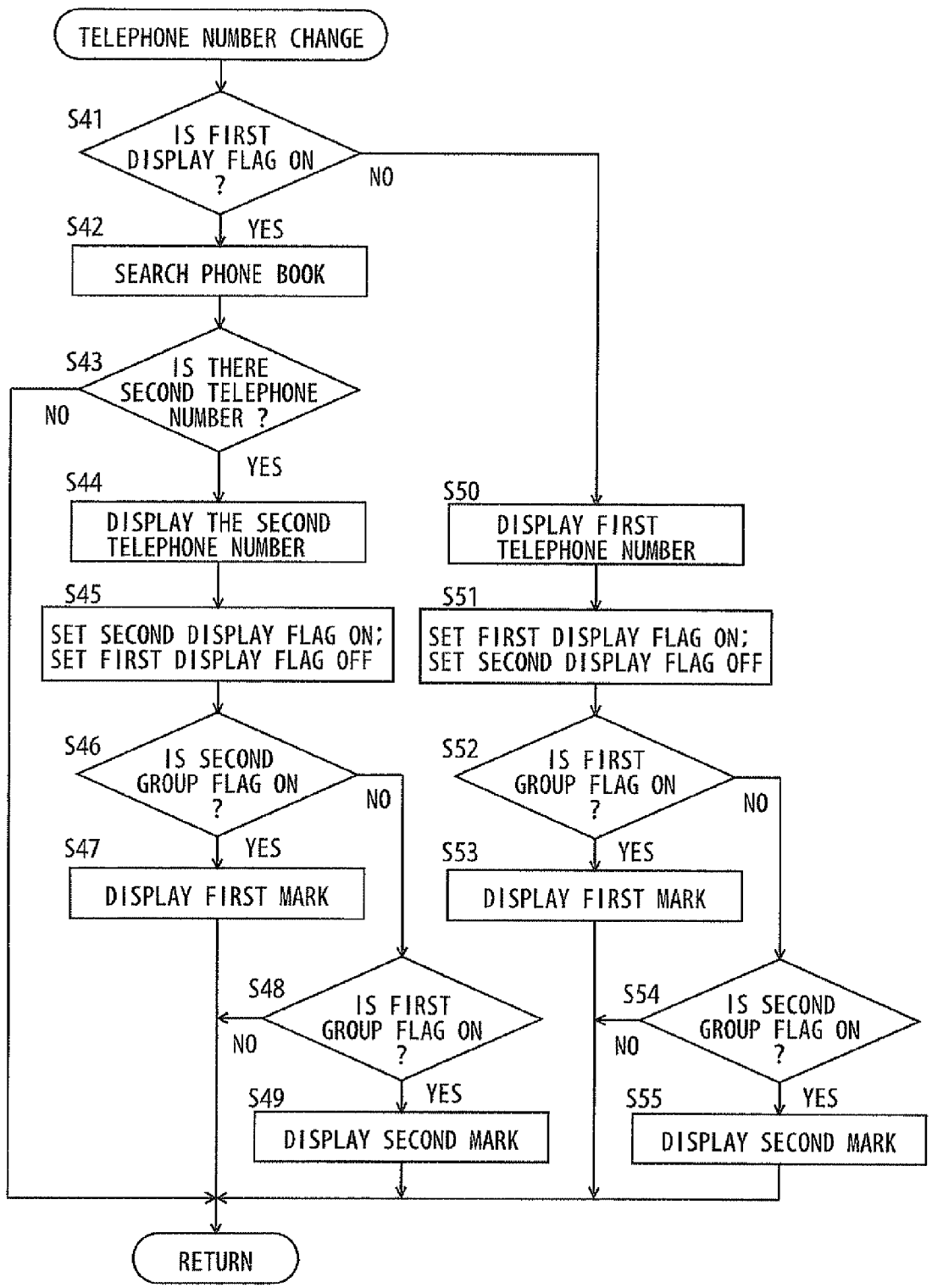
FIG. 8 is a flowchart illustrating an example of the flow of a telephone number changing process.

FIG. 8 is a flowchart illustrating an example of the flow of the telephone number changing process. The telephone number changing process is a process performed in step S13 in FIG. 6. In the case where the telephone number changing process is performed, a piece of history information has been set as a process target. The telephone number changing process is a process of switching the telephone number to be displayed on LCD 15 from the first telephone number to the second telephone number, or from the second telephone number to the first telephone number. Referring to FIG. 8, CPU 21 determines whether the first display flag is set to ONO (step S41). If the first display flag has been set to ON, the process proceeds to step S42; otherwise, the process proceeds to step S50. In step S42, CPU 21 searches phone book 85 stored in flash memory 31 to extract a phone book record that includes the first telephone number included in the history information set as a process target. Then, in the following step S43, CPU 21 determines whether the extracted phone book record includes a second telephone number. The second telephone number is one of the at least one telephone number included in the extracted phone book record that is different from the first telephone number included in the history information. If the extracted phone book record includes the second telephone number, the process proceeds to step S44. On the other hand, if no phone book record has been extracted, or if the extracted phone book record does not include the second telephone number, the process returns to the history grouping process.

In step S44, the second telephone number included in the extracted phone book record is displayed on LCD 15, in place of the first telephone number that has been displayed till then. In the following step S45, the second display flag is set to ON and the first display flag is set to OFF.

Then, in the following step S46, it is determined whether the second group flag for the history information set as a process target is set to ON. If the second group flag has been set to ON, the process proceeds to step S47; otherwise, the process proceeds to step S48. In step S47, a first mark is displayed near the second telephone number that is displayed on LCD 15, and the process returns to the history grouping process. The first mark displayed near the second telephone number can inform a user that the second telephone number displayed on LCD 15 is registered in a group.

In step S48, it is determined whether the first group flag for the history information set as a process target is set to ON. If the first group flag has been set to ON, the process proceeds to step S49; otherwise, the process returns to the history grouping process. In step S49, a second mark is displayed near the second telephone number that is displayed on LCD 15, and the process returns to the history grouping process. The second mark displayed near the second telephone number can inform a user that the second telephone number displayed on LCD 15 is not registered in a group and that the first telephone number is registered in a group.

The case where it is determined in step S48 that the first group flag for the history information set as a process target is not set to ON corresponds to the case where the first group flag and the second group flag are both set to OFF. In this case, nothing is displayed near the second telephone number, which can inform a user that neither the first telephone number nor the second telephone number is registered in a group.

On the other hand, the process proceeds to step S50 in the case where the second display flag has been set to ON. In this case, the first telephone number included in the history information that is set as a process target is displayed on LCD 15, in place of the second telephone number that has been displayed till then. In the following step S51, the first display flag is set to ON and the second display flag is set to OFF.

In the following step S52, it is determined whether the first group flag for the history information set as a process target is set to ON. If the first group flag has been set to ON, the process proceeds to step S53; otherwise, the process proceeds to step S54. In step S53, a first mark is displayed near the first telephone number that is displayed on LCD 15, and the process returns to the history grouping process. The first mark displayed near the first telephone number can inform a user that the first telephone number displayed on LCD 15 is registered in a group.

In step S54, it is determined whether the second group flag for the history information set as a process target is set to ON. If the second group flag has been set to ON, the process proceeds to step S55; otherwise, the process returns to the history grouping process. In step S55, a second mark is displayed near the first telephone number that is displayed on LCD 15, and the process returns to the history grouping process. The second mark displayed near the first telephone number can inform a user that the first telephone number displayed on LCD 15 is not registered in a group and that the second telephone number is registered in a group.

The case where it is determined in step S54 that the second group flag for the history information set as a process target is not set to ON corresponds to the case where the first group flag and the second group flag are both set to OFF. In this case, nothing is displayed near the first telephone number, which can inform a user that neither the first telephone number nor the second telephone number is registered in a group.

Figure 9:
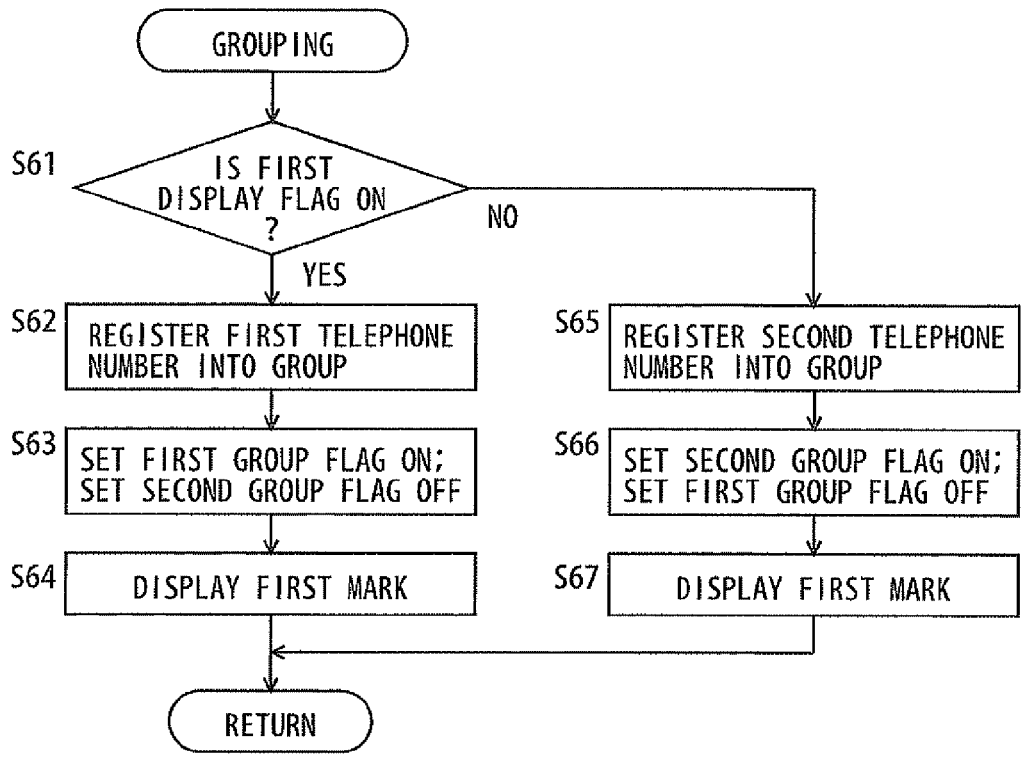
FIG. 9 is a flowchart illustrating an example of the flow of a grouping process.

FIG. 9 is a flowchart illustrating an example of the flow of the grouping process. The grouping process is a process performed in step S15 in FIG. 6. The grouping process is performed when a grouping instruction is accepted in the state where a piece of history information has been set as a process target. In the grouping process, one of the first telephone number and the second telephone number that is being displayed on LCD 15 is registered into a group.

Referring to FIG. 9, CPU 21 determines whether the first display flag is set to ON. If the first display flag has been set to ON, the process proceeds to step S62. If the second display flag has been set to ON, the process proceeds to step S65.

In step S62, the first telephone number included in the history information set as a process target is registered into a group, and the process proceeds to step S63. In step S63, the first group flag is set to ON and the second group flag is set to OFF, and the process proceeds to step S64. In the following step S64, a first mark is displayed near the first telephone number that is displayed on LCD 15, and the process returns to the history grouping process. The first mark displayed near the first telephone number can inform a user that the first telephone number displayed on LCD 15 is registered in a group.

On the other hand, in step S65, the second telephone number that is associated by the phone book record with the first telephone number included in the history information set as the process target is registered into a group, and the process proceeds to step S66. In step S66, the second group flag is set to ON and the first group flag is set to OFF, and the process proceeds to step S67. In the following step S64, a first mark is displayed near the second telephone number that is displayed on LCD 15, and the process returns to the history grouping process. The first mark displayed near the second telephone number can inform a user that the second telephone number displayed on LCD 15 is registered in a group.

Hereinafter, specific examples of a history displaying screen will be described. It is here assumed that phone book 85 includes a phone book record having "Alan Webb" set in the name field and a phone book record having "Bob Smith" set in the name field. In the phone book record including "Alan Webb" in the name field, the telephone number "111-111-1111" is set in the destination 1 field, and the telephone number "222-222-2222" is set in the destination 2 field, In the phone book record including "Bob Smith" in the name field, the telephone number "333-333-3333" is set in the destination 1 field. Further, it is assumed that receiving history information 83 including the telephone number "111-111-1111" and the receiving history information including the telephone number "333-333-3333" are stored. In this case, the telephone number "111-111-1111" and the telephone number "333-333-3333" are the first telephone numbers.

Figure 10:
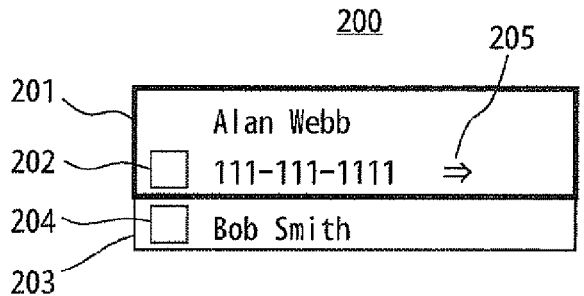
FIG. 10 is a first diagram showing an example of a history displaying screen.

FIG. 10 is a first diagram showing an example of the history displaying screen. Referring to FIG. 10, a history displaying screen 200 includes areas 201 and 203 for displaying two pieces of history information in the form of a list. Displayed in area 201 are the name "Alan Webb" of a source of an incoming call, the telephone number "111-111-1111" as the communication identification information, and an arrow 205, arranged to the right of the telephone number, representing a right arrow key for inputting a switching instruction. Displayed in area 203 is the name "Bob Smith" of a source of an incoming call. This screen shows the state where the history information displayed in area 201 has been selected, so that area 201 is highlighted. While the highlighted area 201 is delimited by a thick frame in the figure, the display pattern showing that the history information has been selected is not limited to highlighting. For example, the color or font of characters may be differentiated, the color or pattern of the background may be differentiated, or the brightness may be differentiated.

Further, check boxes 202 and 204 are displayed leftmost in areas 201 and 203, respectively. Check boxes 202 and 204 are areas for a user to input a grouping instruction therein, and after a group registration process, they are areas in which a first mark or a second mark is displayed to indicate whether the telephone number is registered in a group or not. When history information is first displayed, areas 200 and 203 are blank, with nothing displayed therein.

Figure 11:
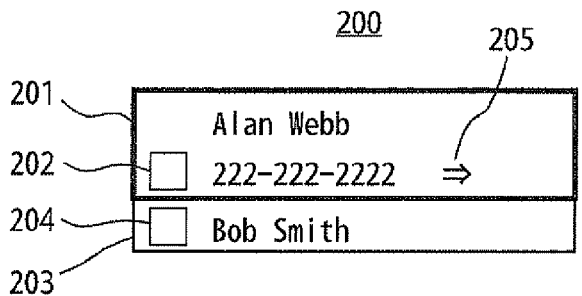
FIG. 11 is a second diagram showing an example of the history displaying screen.

FIG. 11 is a second diagram showing an example of the history displaying screen. History displaying screen 200 shown in FIG. 11 is displayed when the right arrow key, included in operation keys 14, for inputting a switching instruction is depressed in history displaying screen 200 shown in FIG. 10. The first telephone number "111-111-1111", which was displayed in area 201 in history display screen shown in FIG. 10, is changed to the second telephone number "222-222-2222". This can inform a user that a second telephone number different from the first telephone number is registered in the phone book.

Further, the history information that is displayed in area 201 is selected, so that area 201 is highlighted. This can inform a user that the history information displayed in area 201 has been selected as a process target. Furthermore, check box 202 in area 201 is blank, with nothing displayed therein. This can inform a user that neither one of the first telephone number and the second telephone number included in the history information being displayed in area 201 is registered in a group.

Furthermore, check box 204 in area 203 is blank, with nothing displayed therein. This can inform a user that the first telephone number included in the history information being displayed in area 203 is not registered in a group.

Figure 12:
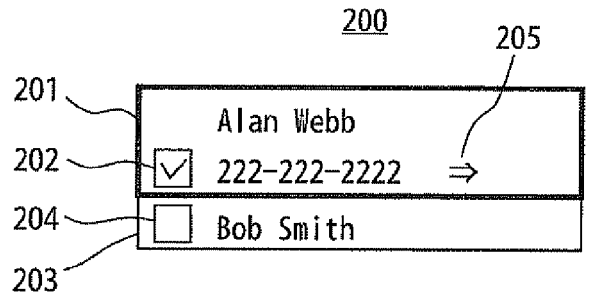
FIG. 12 is a third diagram showing an example of the history displaying screen.

FIG. 12 is a third diagram showing an example of the history displaying screen. History displaying screen 200 shown in FIG. 12 is displayed when one of operation keys 14 for use in inputting a group registration instruction is depressed in history displaying screen 200 shown in FIG. 11. In check box 202 arranged next to the second telephone number "222-222-2222", which was displayed in area 201 in FIG. 11, a check mark as the first mark is displayed. This can inform a user that the displayed second telephone number "222-222-2222" has been registered into a group. It is noted that, when the key in operation keys 14 used for inputting a group registration instruction is depressed in the state where history displaying screen 200 shown in FIG. 12 is being displayed, history displaying screen 200 shown in FIG. 11 is displayed.

Figure 13:
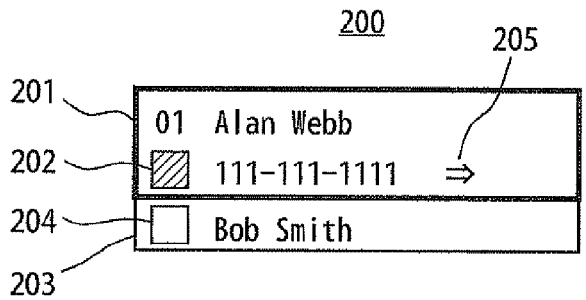
FIG. 13 is a fourth diagram showing an example of the history displaying screen.

FIG. 13 is a fourth diagram showing an example of the history displaying screen. History displaying screen 200 shown in FIG. 13 is displayed when the right arrow key, included in operation keys 14, for inputting a switching instruction is depressed in history displaying screen 200 shown in FIG. 12. The second telephone number "222-222-2222", which was displayed in the selected area 201 in history displaying screen 200 shown in FIG. 12, is changed to the first telephone number "111-111-1111", and in check box 202 arranged next to the first telephone number "111-111-1111", a hatch pattern as the second mark is displayed. This can inform a user that the second telephone number different from the first telephone number being displayed is registered in a group.

It is noted that, when the right arrow key, included in operation keys 14, for inputting a switching instruction is depressed in the state where history displaying screen 200 shown in FIG. 13 is being displayed, history displaying screen 200 shown in FIG. 12 is displayed.

Figure 14:
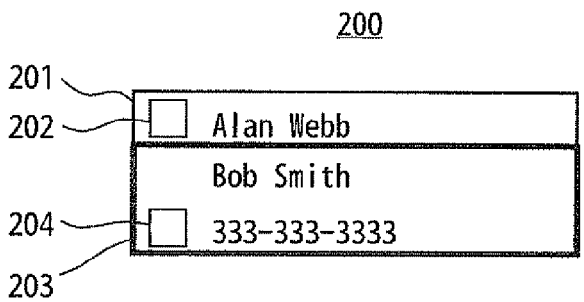
FIG. 14 is a fifth diagram showing an example of the history displaying screen.

FIG. 14 is a fifth diagram showing an example of the history displaying screen. History displaying screen 200 shown in FIG. 14 is displayed when the down arrow key, included in operation keys 14, for inputting a selecting instruction is depressed in history displaying screen 200 shown in FIG. 11. Below the name "Bob Smith" of the source of an incoming call, which was displayed in area 201 in history displaying screen 200 in FIG. 11, the first telephone number "333-333-3333" is displayed. Further, the history information that is displayed in area 203 is selected, so that area 203 is highlighted. This can inform a user that the history information displayed in area 203 has been selected as a process target.

Further, check box 204 arranged next to the first telephone number "333-333-3333" in area 203 is blank, with nothing displayed therein. This can inform a user that neither one of the first telephone number and the second telephone number displayed in area 203 is registered in a group. Furthermore, check box 202 in area 201 is blank, with nothing displayed therein. This can inform a user that neither one of the first telephone number and the second telephone number included in the history information being displayed in area 201 is registered in a group.

It is noted that, when the up arrow key, included in operation keys 14, for inputting a selecting instruction is depressed in the state where history displaying screen 200 shown in FIG. 14 is being displayed, history displaying screen 200 shown in FIG. 11 is displayed.

Figure 15:
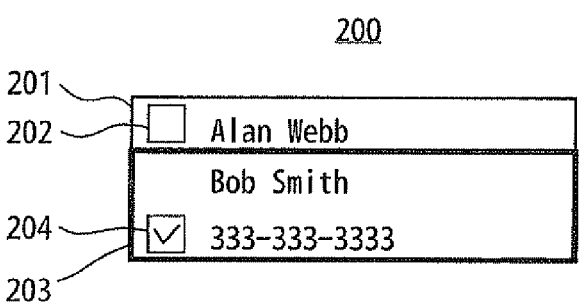
FIG. 15 is a sixth diagram showing an example of the history displaying screen.

FIG. 15 is a sixth diagram showing an example of the history displaying screen. History displaying screen 200 shown in FIG. 15 is displayed when one of operation keys 14 for use in inputting a group registration instruction is depressed in history displaying screen 200 shown in FIG. 14. In check box 202 arranged next to the first telephone number "333-333-3333", which was displayed in the selected area 201 in FIG. 14, a check mark as the first mark is displayed. This can inform a user that the first telephone number "333-333-3333" has been registered into a group.

It is noted that, when the key in operation keys 14 for use in inputting a group registration instruction is depressed in the state where history displaying screen 200 shown in FIG. 15 is being displayed, history displaying screen 200 shown in FIG. 14 is displayed.

Figure 16:
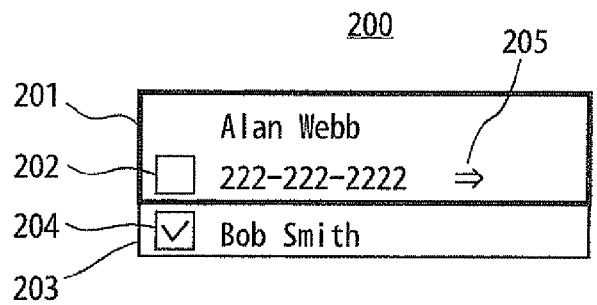
FIG. 16 is a seventh diagram showing an example of the history displaying screen.

FIG. 16 is a seventh diagram showing an example of the history displaying screen. History displaying screen 200 shown in FIG. 16 is displayed when the up arrow key, included in operation keys 14, for inputting a selecting instruction is depressed in history displaying screen 200 shown in FIG. 15. Below the name "Alan Webb" of the source of an incoming call, which was displayed in area 201 in history displaying screen 200 shown in FIG. 15, the second telephone number "222-222-2222" is displayed. This is because the second telephone number "222-222-2222" is selected as a display target, as shown in history displaying screen 200 in FIG. 11.

Further, the history information that is displayed in area 201 is selected, so that area 201 is highlighted. This can inform a user that the history information displayed in area 201 has been selected as a process target. Furthermore, check box 202 in area 201 is blank, with nothing displayed therein. This can inform a user that neither one of the first telephone number and the second telephone number included in the history information being displayed in area 201 is registered in a group.

Furthermore, a check mark as the first mark is displayed in check box 204 in area 203. This can inform a user that the first telephone number or the second telephone number of the user having the name displayed in area 203 is registered in a group.

It is noted that, when the down arrow key, included in operation keys 14, for inputting a selecting instruction is depressed in the state where history displaying screen 200 shown in FIG. 16 is being displayed, history displaying screen 200 shown in FIG. 15 is displayed.

Figure 17:
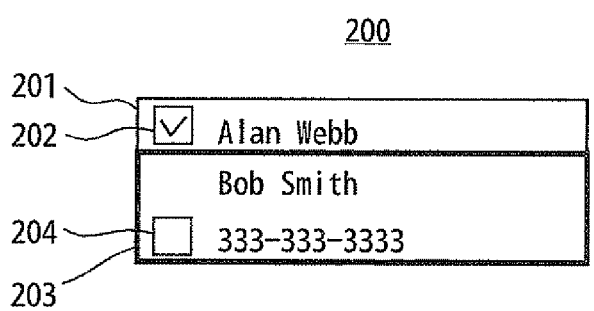
FIG. 17 is an eighth diagram showing an example of the history displaying screen.

FIG. 17 is an eighth diagram showing an example of the history displaying screen. History displaying screen 200 shown in FIG. 17 is displayed when the down arrow key, included in operation keys 14, for inputting a selecting instruction is depressed in history displaying screen 200 shown in FIG. 12. Below the name "Bob Smith" of the source of an incoming call, which was displayed in area 203 in history displaying screen 200 shown in FIG. 12, the first telephone number "333-333-3333" is displayed. Further, the history information that is displayed in area 203 is selected, so that area 203 is highlighted. This can inform a user that the history information displayed in area 203 has been selected as a process target. Furthermore, check box 202 in area 203 is blank, with nothing displayed therein. This can inform a user that the first telephone number included in the history information being displayed in area 201 is not registered in a group.

Furthermore, a check mark as the first mark is displayed in check box 204 in area 201. This can inform a user that the first telephone number or the second telephone number included in the history information being displayed in area 201 is registered in a group.

It is noted that, when the up arrow key, included in operation keys 14, for inputting a selecting instruction is depressed in the state where history displaying screen 200 shown in FIG. 17 is being displayed, history displaying screen 200 shown in FIG. 12 is displayed.

Figure 18:
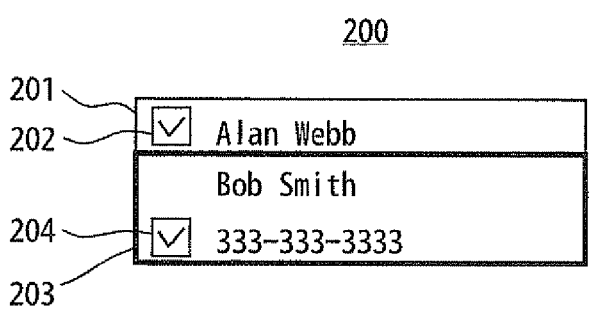
FIG. 18 is a ninth diagram showing an example of the history displaying screen.

FIG. 18 is a ninth diagram showing an example of the history displaying screen. History displaying screen 200 shown in FIG. 18 is displayed when one of operation keys 14 for use in inputting a group registration instruction is depressed in history displaying screen 200 shown in FIG. 17. In check box 202 arranged next to the first telephone number "333-333-3333", which was displayed in the selected area 203 in FIG. 17, a check mark as the first mark is displayed. This can inform a user that the first telephone number "333-333-3333" has been registered into a group. Furthermore, a check mark as the first mark remains displayed in check box 202 in area 201. This can inform a user that the first telephone number or the second telephone number included in the history information being displayed in area 201 is registered in a group.

It is noted that, when the key in operation keys 14 for use in inputting a group registration instruction is depressed in the state where history displaying screen 200 shown in FIG. 18 is being displayed, history displaying screen 200 shown in FIG. 17 is displayed.

Figure 19:
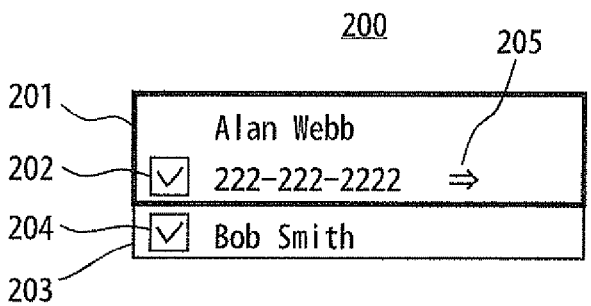
FIG. 19 is a tenth diagram showing an example of the history displaying screen.

FIG. 19 is a tenth diagram showing an example of the history displaying screen. History displaying screen 200 shown in FIG. 19 is displayed when the up arrow key, included in operation keys 14, for inputting a selecting instruction is depressed in history displaying screen 200 shown in FIG. 18. Below the name "Alan Webb" of the source of an incoming call, which was displayed in area 201 in history displaying screen 200 shown in FIG. 18, the second telephone number "222-222-2222" is displayed. This is because the second telephone number "222-222-2222" is selected as a display target, as shown in history displaying screen 200 in FIG. 12. Further, the history information that is displayed in area 201 is selected, so that area 201 is highlighted. This can inform a user that the history information displayed in area 201 has been selected as a process target.

Furthermore, a check mark as the first mark remains displayed in check box 204 in area 201. This can inform a user that the second telephone number "222-222-2222" being displayed in area 201 is registered in a group.

Furthermore, a check mark as the first mark remains displayed in check box 204 in area 203. This can inform a user that the first telephone number of the user of the name being displayed in area 203 is registered in a group.

It is noted that, when the down arrow key, included in operation keys 14, for inputting a selecting instruction is depressed in the state where history displaying screen 200 shown in FIG. 19 is being displayed, history displaying screen 200 shown in FIG. 18 is displayed.

Figure 20:
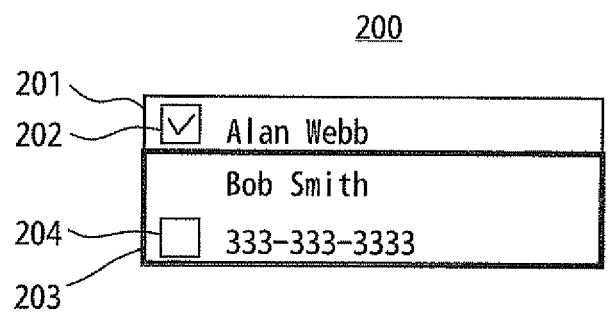
FIG. 20 is an eleventh diagram showing an example of the history displaying screen.

FIG. 20 is an eleventh diagram showing an example of the history displaying screen. History displaying screen 200 shown in FIG. 20 is displayed when the down arrow key, included in operation keys 14, for inputting a selecting instruction is depressed in history displaying screen 200 shown in FIG. 13. In the state where history displaying screen 200 shown in FIG. 13 is being displayed, the second telephone number included in the history information that is displayed in the first area is registered in a group, whereas neither one of the first telephone number and the second telephone number included in the history information that is displayed in the second area is registered in a group.

Referring to FIG. 20, below the name "Bob Smith" of the source of an incoming call, which was displayed in area 203 in FIG. 13, the first telephone number "333-333-3333" is displayed. Further, the history information that is displayed in area 203 is selected, so that area 203 is highlighted. This can inform a user that the history information displayed in area 203 has been selected as a process target.

Further, a check mark as the first mark is displayed in check box 204 in area 201. This can inform a user that the first telephone number or the second telephone number included in the history information being displayed in area 201 is registered in a group.

Furthermore, check box 204 in area 203 is blank, with nothing displayed therein. This can inform a user that the first telephone number included in the history information being displayed in area 203 is not registered in a group.

It is noted that, when the up arrow key, included in operation keys 14, for inputting a selecting instruction is depressed in the state where history displaying screen 200 shown in FIG. 20 is being displayed, history displaying screen 200 shown in FIG. 13 is displayed.

Figure 21:
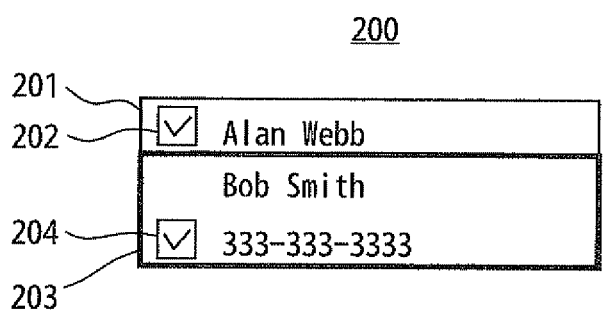
FIG. 21 is a twelfth diagram showing an example of the history displaying screen.

FIG. 21 is a twelfth diagram showing an example of the history displaying screen. History displaying screen 200 shown in FIG. 21 is displayed when one of operation keys 14 for use in inputting a group registration instruction is depressed in history displaying screen 200 shown in FIG. 20. In check box 204 arranged next to the first telephone number "333-333-3333", which was displayed in area 203 in history displaying screen 200 shown in FIG. 20, a check mark as the first mark is displayed. This can inform a user that the first telephone number "333-333-3333" has been registered into a group.

The check mark as the first mark remains displayed in check box 202 in area 201. This can inform a user that the first telephone number or the second telephone number included in the history information being displayed in area 201 is registered in a group.

It is noted that, when the key in operation keys 14 for use in inputting a group registration instruction is depressed in the state where history displaying screen 200 shown in FIG. 21 is being displayed, history displaying screen 200 shown in FIG. 20 is displayed.

Figure 22:
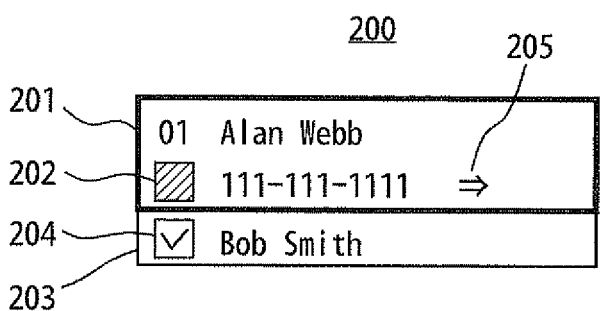
FIG. 22 is a thirteenth diagram showing an example of the history displaying screen.

FIG. 22 is a thirteenth diagram showing an example of the history displaying screen. History displaying screen 200 shown in FIG. 22 is displayed when the up arrow key, included in operation keys 14, for inputting a selecting instruction is depressed in history displaying screen 200 shown in FIG. 21. Below the name "Alan Webb" of the source of an incoming call, which was displayed in area 201 in history displaying screen 200 shown in FIG. 21, the first telephone number "111-111-1111" is displayed. This is because the second telephone number "111-111-1111" is selected as a display target, as shown in history displaying screen 200 in FIG. 13.

Further, the history information that is displayed in area 201 is selected, so that area 201 is highlighted. This can inform a user that the history information displayed in area 201 has been selected as a process target.

Furthermore, a hatch pattern as the second mark is displayed in check box 202 in area 201. This is because the second telephone number "222-222-2222" is registered in a group, as shown in history displaying screen 200 in FIG. 12. This can inform a user that the second telephone number that is different from the first telephone number "111-111-1111" being displayed in area 201 is registered in a group.

Furthermore, the check mark as the first mark remains displayed in check box 204 in area 203. This can inform a user that the first telephone number included in the history information being displayed in area 203 is registered in a group.

It is noted that, when the down arrow key, included in operation keys 14, for inputting a selecting instruction is depressed in the state where history displaying screen 200 shown in FIG. 22 is being displayed, history displaying screen 200 shown in FIG. 21 is displayed.

As described above, according to mobile phone 1 of the present embodiment, calling history information 82 or receiving history information 83 including a telephone number is displayed and, in the case where a phone book record (personal information) including a first telephone number (communication identification information) that is included in that calling history information 82 or receiving history information 83 includes a second telephone number, a display is switched to the first telephone number or the second telephone number in response to an input of an operation of changing the telephone number, and the telephone number that is being displayed is registered into a group. This allows the second telephone number that is different from the first telephone number stored as calling history information 82 or receiving history information 83 to be registered into a group. Further, calling history information 82 or receiving history information 83 including the first telephone number is displayed and, in the case where a phone book record including the first telephone number that is included in calling history information 82 or receiving history information 83 selected as a process target includes a second telephone number, a display is switched to the first telephone number or the second telephone number in response to an input of an operation of switching a display. On the other hand, when a process target is changed, a telephone number newly displayed is determined to be the one that had been displayed when the relevant information was previously selected as the process target, which is either the first telephone number that is included in that calling history information 82 or receiving history information 83 selected as the new process target, or the second telephone number that is associated by the phone book record with that first telephone number. This allows the previously displayed one of the first telephone number and the second telephone number to be displayed, eliminating the need to repeat the previous operation.

Further, in the case where the first telephone number or the second telephone number has been registered in a group, a check mark or a hatch pattern is displayed, which can inform a user that the first telephone number or the second telephone number is registered in a group. That is, the telephone number registered in a group can be notified to the user.

Furthermore, the check mark is displayed in the case where the one of the first and second telephone numbers that is being displayed is registered in a group, whereas the hatch pattern is displayed in the case where the one of the first and second telephone numbers that is being displayed is not registered in a group. This can inform a user which one of the first telephone number and the second telephone number is registered in a group, or inform a user that neither of them is registered in a group.

While mobile phone 1 has been described as an example of the communication device in the above embodiment, it is needless to say that the invention may be understood as a communication history display method for executing the processing shown in FIG. 6, or as a communication history display program for causing CPU 21 which controls mobile phone 1 to perform the communication history display method.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A communication device, comprising:
a personal information storing portion to store personal information in which personal identification information for identifying a person is associated with at least one piece of communication identification information assigned to the person for use in communication;
a communication history storing portion to store history information showing a history of communication, the history information including the communication identification information of a communication partner in the past; and
a grouping portion to generate a group in which at least one piece of the communication identification information is collected together on the basis of said stored history information or said stored personal information,
said grouping portion including
a history displaying portion to display said stored history information,
a selecting portion to select one piece of said displayed history information as a process target, and
a display switching portion, in the case where said personal information includes first communication identification information included in said selected history information and second communication identification information different from said first communication identification information, to switch a display to said first communication identification information or said second communication identification information in response to an input of an operation for switching a display; wherein
in the case where the process target is changed by said selecting portion, said display switching portion displays one of said first communication identification information and said second communication identification information, included in the history information newly selected as the process target, that is the same as the one that had been displayed when said history information was previously selected as the process target by said selecting portion.

2. The communication device according to claim 1, wherein said grouping portion further includes a registration portion, operative in response to an input of an operation of registering information into a group, to register a currently displayed one of said first communication identification information and said second communication identification information, included in the history information selected by said selecting portion, into a group.

3. The communication device according to claim 1, further comprising:
a group accepting portion to accept a designation of said group; and
a calling portion to originate a call or e-mail to at least one piece of the communication identification information registered in the group specified by said accepted designation.

4. The communication device according to claim 1, wherein said grouping portion further includes a mark displaying portion to display a mark indicating that said first communication identification information or said second communication identification information is registered in a group.

5. The communication device according to claim 4, wherein said mark displaying portion includes
a first mark displaying portion to display a first mark in the case where the one of said first communication information and said second communication information that is being displayed by said display switching portion has been registered by said registration portion, and
a second mark displaying portion to display a second mark in the case where the one of said first communication information and said second communication information that is being displayed by said display switching portion has not been registered by said registration portion.

6. A communication history display method, comprising steps of:
storing personal information in which personal identification information for identifying a person is associated with at least one piece of communication identification information assigned to the person for use in communication;

storing history information showing a history of communication, the history information including the communication identification information of a communication partner in the past; and generating a group in which at least one piece of the communication identification information is collected together on the basis of said stored history information or said stored personal information, said step of generating a group including steps of
  displaying said stored history information,
  selecting one piece of said displayed history information as a process target, and
  in the case where said personal information includes first communication identification information included in said displayed history information and second communication identification information different from said first communication identification information, switching a display to said first communication identification information or said second communication identification information in response to an input of an operation for switching a display; wherein said step of switching a display includes a step of, in the case where the process target is changed in said selecting step, displaying one of said first communication identification information and said second communication identification information, included in the history information newly selected as the process target, that is the same as the one that had been displayed when said history information was previously selected as the process target in said selecting step.

7. The communication history display method according to claim 6, wherein said step of generating a group further includes a step of, in response to an input of an operation of registering information into a group, registering a currently displayed one of said first communication identification information and said second communication identification information, included in the history information selected in said selecting step, into a group.

8. The communication history display method according to claim 6, further comprising steps of:
  accepting a designation of said group; and
  originating a call or e-mail to at least one piece of the communication identification information registered in the group specified by said accepted designation.

9. The communication history display method according to claim 6, wherein said step of generating a group further includes a step of displaying a mark indicating that said first communication identification information or said second communication identification information is registered in a group.

10. The communication history display method according to claim 9, wherein said step of displaying a mark includes steps of
  displaying a first mark in the case where the one of said first communication information and said second communication information that is displayed in said step of switching a display has been registered in said registering step, and
  displaying a second mark in the case where the one of said first communication information and said second communication information that is displayed in said step of switching a display has not been registered in said registering step.

11. A non-transitory computer-readable recording medium recorded with a communication history display program, the program causing a computer to execute steps of:
  storing personal information in which personal identification information for identifying a person is associated with at least one piece of communication identification information assigned to the person for use in communication;
  storing history information showing a history of communication, the history information including the communication identification information of a communication partner in the past; and
  generating a group in which at least one piece of the communication identification information is collected together on the basis of said stored history information or said stored personal information,
  said step of generating a group including steps of
    displaying said stored history information,
    selecting one piece of said displayed history information as a process target, and
    in the case where said personal information includes first communication identification information included in said displayed history information and second communication identification information different from said first communication identification information, switching a display to said first communication identification information or said second communication identification information in response to an input of an operation for switching a display; wherein
  said step of switching a display includes a step of, in the case where the process target is changed in said selecting step, displaying one of said first communication identification information and said second communication identification information, included in the history information newly selected as the process target, that is the same as the one that had been displayed when said history information was previously selected as the process target in said selecting step.

* * * * *